United States Patent [19]

Klemmensen et al.

[11] 4,148,746
[45] Apr. 10, 1979

[54] AQUEOUS GELS

[75] Inventors: Daniel F. Klemmensen, Akron; Richard G. Bauer, Kent, both of Ohio

[73] Assignee: The Goodyear Tire & Rubber Company, Akron, Ohio

[21] Appl. No.: 836,863

[22] Filed: Sep. 26, 1977

[51] Int. Cl.² ............ E23B 43/22; E21B 33/138
[52] U.S. Cl. .................... 252/316; 166/273; 166/274; 166/275; 166/295; 252/8.55 D; 260/29.6 Z
[58] Field of Search .............. 252/8.55 D, 316; 166/274, 275

[56] References Cited

U.S. PATENT DOCUMENTS

| | | | |
|---|---|---|---|
| 2,842,492 | 7/1958 | von Engelhardt et al. | 252/8.55 |
| 3,649,581 | 3/1972 | Mast et al. | 8/120 X |
| 3,724,547 | 4/1973 | Bott | 166/275 X |
| 3,909,423 | 9/1975 | Hessert et al. | 252/8.55 |
| 3,926,258 | 12/1975 | Hessert et al. | 166/275 X |

Primary Examiner—Herbert B. Guynn
Attorney, Agent, or Firm—J. Y. Clowney

[57] ABSTRACT

There is disclosed an aqueous medium comprising water to which has been added a water thickening amount of a water thickening polymer which is prepared by polymerizing at least one alkyl acrylate monomer and at least one carboxylic polymerizable monomer selected from the group consisting of acrylic acid and methacrylic acid which are present from 20 to 95 parts by weight per hundred parts of total monomer being polymerized and utilizing, as an ionic emulsifier, an emulsifier selected from the group consisting of disodium or diammonium nonylphenoxy polyethoxy sulfosuccinate having the general formula:

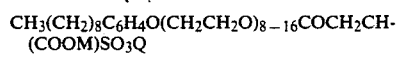

$$CH_3(CH_2)_8C_6H_4O(CH_2CH_2O)_{8-16}COCH_2CH(COOM)SO_3Q$$

wherein Q is sodium or ammonium and a sodium or ammonium lauryl polyethoxysulfate having the general formula:

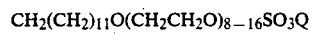

$$CH_2(CH_2)_{11}O(CH_2CH_2O)_{8-16}SO_3Q$$

wherein Q is sodium or ammonium, said polymer in latex form being neutralized to a pH ranging between a pH of 5.5 to 11.5. Such polymers may also be gelled with water soluble polyvalent compounds such as sodium dichromate and water soluble reducing agents such as sodium hydrosulfite. The aqueous gels are employed in enhanced oil recovery.

12 Claims, No Drawings

AQUEOUS GELS

This invention relates to methods of preparing and using aqueous gels from carboxylic latices.

The enhanced recovery of oil or oil bearing or oil containing subterranean formations by flushing these formations with a fluid which is injected into the formation by means of one or more injection wells to drive the oil through the formation to one or more production oils is a well known process. The enhanced recovery of oil by such processes include the use of liquids, such as water and various hydrocarbons. It also includes the use of gases such as hydrocarbon gases, carbon dioxide and the like.

In enhanced oil recovery operations using either a gas or a low viscosity liquid, such as water or hydrocarbons, there is presented a problem of channeling of such low viscosity gases or liquids through the oil to more permeable areas and such a process is referred to as fingering. Many instances of such channeling or fingering results in leaving substantial quantities of the residual oil in the oil bearing formations by bypassing it. Attempts have been made to prevent this channeling or fingering by the use of drilling fluids which are normally used in the drilling of oil wells which are normally aqueous liquids containing clays or other colloidal materials usually referred to as drilling muds. These drilling fluids usually serve as a lubricant for the drilling bit and the drilling stem and as a medium for carrying the cuttings produced by the drilling operation to the surface and to assist in the formation of a cake on the walls of the bore hole as the strata being bored into is porous in nature.

It has been known that certain aqueous gels can be employed as an aqueous medium in the enhanced recovery of oil. For instance, in U.S. Pat. No. 3,909,423 there is disclosed a composition useful for the secondary recovery of oil which is an aqueous medium comprising water in which polyacrylamides and polymethacrylamides in which from about 0.1 to about 14% of the carboxyamide groups are hydrolyzed to carboxyl groups. This patent also discloses crosslinked polyacrylamides and crosslinked polymethacrylamides wherein from 0.1 to 14% of the carboxyamide groups are hydrolyzed to carboxyl groups. These polymers are utilized in amounts from about 0.025 to about 5% by weight based on the weight of the water in which they are mixed. These mixtures also contain from about 0.5 to about 60 weight percent of a polyvalent material such as sodium dichromate and from 0.1 to at least about 200% of the stoichiometric amount of a reducing agent such as sodium hydrosulfite required to reduce the polyvalent metal such as the chromium in the sodium dichromate to a lower valent state.

U.S. Pat. No. 3,891,567 discloses compositions useful for the improved oil recovery and flooding of subterranean oil bearing formations which are aqueous solutions of about 0.001% to about 10% of a partially hydrolyzed polyacrylamide and about 0.001% at about 10% of a carboxy vinyl polymer. These polyacrylamides have a molecular weight ranging from about 500,000 to about 20 million.

U.S. Pat. No. 3,679,000 discloses a process for tertiary oil recovery which comprises injecting viscous water into the area of the oil deposit through an input well by incorporating into the water a minor amount of a water soluble polymer containing 5% of a repeat unit of the formula:

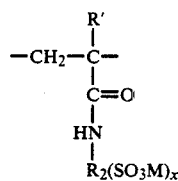

wherein R' is a hydrogen or lower alkyl, $R_2$ is a divalent or trivalent hydrocarbon and M is hydrogen or one equivalent of a cation, and X is one or two.

It has been observed that in order to utilize an aqueous gel in the enhanced recovery of oil, an aqueous gel have a Brookfield viscosity of 20 and 30 centipoise (cps), obtained on a Brookfield viscometer, using spindle No 1, at 60 revolutions per minute. All viscosity measurements employed in this application refer to the viscosity obtained with a Brookfield viscometer utilizing spindle No. 1 at a speed of 60 revolutions per minute.

According to the invention there is provided an aqueous medium comprising water to which has been added a water thickening amount of a water thickening polymer which is prepared by polymerizing at least one alkyl acrylate monomer and at least one carboxylic polymerizable monomer selected from the group consisting of acrylic acid and methacrylic acid which are present from 20 to 95 parts by weight per hundred parts of total monomer being polymerized and utilizing, in an ionic emulsifier, as emulsifier selected from the group consisting of disodium or diammonium nonylphenoxy polyethoxy sulfosuccinate having the general formula:

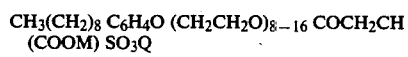

wherein Q is sodium or ammonium and a sodium or ammonium lauryl polyethoxysulfate having the general formula:

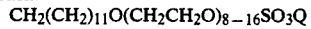

wherein Q is sodium or ammonium, said polymer in latex form being neutralized to a pH ranging between a pH of 5.5 to 11.5.

Also, according to the invention, there is provided a method wherein a fluid medium is introduced into a bore hole in the earth and into contact with a nonfractured porous subterranean formation penetrated by said bore hole, said fluid medium being an aqueous medium comprising water to which has been added a water-thickening amount of a water-thickening polymer which is prepared by polymerizing at least one alkyl acrylate monomer and at least one carboxylic polymerizable monomer selected from the group consisting of acrylic acid and methacrylic acid which are present from 20 to 95 parts by weight per hundred parts of total monomer being polymerized and utilizing as an ionic emulsifier, an emulsifier selected from the group consisting of disodium or diammonium nonylphenoxy polyethoxy sulfosuccinate having the general formula:

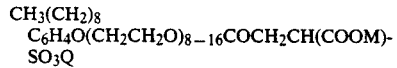

wherein Q is sodium or ammonium and a sodium or ammonium lauryl polyethoxysulfate having the general formula:

$$CH_3(CH_2)_{11}O(CH_2CH_2O)_{8-16}SO_3Q$$

wherein Q is sodium or ammonium, said polymer in latex form has been neutralized to a pH ranging between a pH of 5.5 to 11.5 and containing from about 1 to about 200 weight percent of a water soluble compound of a polyvalent metal in which the valence of the metal is capable of being reduced to a lower valent state and from about 1 to about 200 amount of a water soluble reducing agent, based on the weight of said polymer, which is effective to reduce at least a portion of said metal to its lower valent state.

Further, according to the invention, there is provided a method for producing an aqueous gel which comprises thickening water by adding to said water at least 500 parts per million of a polymer which is prepared by polymerizing at least one alkyl acrylate monomer and at least one carboxylic polymerizable monomer selected from the group of acrylic acid and methacrylic acid, present in at least 20 parts to about 95 parts per hundred parts of monomer being polymerized and utilizing, as an ionic emulsifier, an emulsifier selected from the group consisting of disodium or diammonium nonylphenoxy polyethoxysulfosuccinate having the general formula:

$$\begin{array}{l}CH_3(CH_2)_8\\C_6H_4O(CH_2CH_2O)_{8-16}COCH_2CH(COOM)\\SO_3Q\end{array}$$

wherein Q is sodium or ammonium and a sodium or ammonium lauryl polyethoxysulfate having the general formula:
$$CH_3(CH_2)_{11}O(CH_2CH_2O)_{8-16}SO_3Q$$

wherein Q is sodium or ammonium, said polymer in latex form has been neutralized to a pH ranging between a pH of 5.5 to 11.5 and containing from about 5 to about 200 weight percent of a water soluble compound of a polyvalent metal in which the valence of the metal is capable of being reduced to a lower valent state, based on the weight of said polymer, and from about 5 to about 200 weight % of a water soluble reducing agent which is effective to reduce at least a portion of said metal compound to its lower valent state, based on the weight of said polymer.

The water thickening polymers utilized in this invention are prepared from at least one alkyl acrylate and a carboxylic monomer such as acrylic acid or methacrylic acid. The amounts of methacrylic acid or acrylic acid employed should be at least 20 to about 95 parts per hundred parts of total monomer to be polymerized. A more preferable range of acrylic acid or methacrylic acid in these polymers is from about 55 to about 75 parts per hundred parts of total monomer to be polymerized. Additional information concerning the preparation of such polymers is set forth in U.S. Pat. No. 3,649,581.

The acidic polymer latices employed can be neutralized with any basic neutralizing agent so that the pH ranges from about 5.5 to about 11.5 with a more preferable pH range of from about 6.5 to about 8.5. The neutralizing agent can be any basic material. It is especially preferred to employ sodium hydroxide or potassium hydroxide, although various amines and other basic materials may be employed.

The amount of the water-thickening polymer used in forming the gels in the practice of this invention can vary widely depending upon the particular polymer used, the purity of said polymer, the property desired in the aqueous gels.

In general, the amount of polymer used would be a water-thickening amount i.e., at least an amount which will significantly thicken the water or brine to which it is added. For example, amounts of polymer in the order of 500 to 2500 parts per million (ppm) have been found to significantly thicken water. For example, still water containing 500 ppm of such a polymer has a Brookfield viscosity of about 20 cP. At 2500 ppm, the viscosity is about 260 cP compared to a value of 1.0 cP for distilled water without added crosslinked polymers. Generallyspeaking, amounts in the range of from 500 to 2500 ppm with preferably from 1000 to 2000 ppm, based on the weight of water or brine, can be used.

Another way of indicating the amount of polymer to be employed in the practice of this invention is to state that 0.05 to about 2% by weight of polymer based on the weight of water may be employed. A more preferable range is from about 0.1 to about 0.5 percent by weight.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal containing compounds for use in the practice of the invention. The hexavalent chromium in said chromium compounds is reduced in situ to trivalent chromium by suitable reducing agents, as discussed hereinafter. In the permanganate compounds, the manganese is reduced from +7 valence to +4 valence as in $MnO_2$.

The amount of said metal-containing compounds used in the practice of the invention will be a sensible amount, i.e., a small but finite amount which is more than indicidental impurities, but which is effective or sufficient to cause subsequent gelation of the polymer when the metal in the polyvalent metal compound is reduced to a lower polyvalent valence state. The lower limit of the concentration of the starting metal-containing compound will depend upon several factors including the particular type of polymer used, the concentration of the polymer in the water or brine to be gelled, the water or brine which is used, and the type of gel product desired. For similar reasons, the upper limit on the concentration of the starting metal-containing compound also cannot always be precisely defined. However, it should be noted that excessive amounts of the starting metal compound, for example, +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 1.0 to 200 weight percent, with 3.0 to 100 weight percent based on the weight of the polymer used in the formation of the gel, being preferred. However, in some situations, it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. Stable gels have been prepared using brines having a wide range of dissolved solids content, e.g., greater than 60,000 ppm, and higher, total dissolved solids, depending upon the particular polymer used having a degree of hydrolysis as defined above, and the brine used. Gelation rates are frequently faster when using said brines. Such oil field brines commonly contain varying amounts of sodium chloride, calcium chloride, magnesium chloride, etc. Sodium chloride is usually present in the greatest concentration.

Water, having a total dissolved solids content greater than 10,000 ppm by weight, may be used for preparing the gels described herein. Good results have been obtained when using brines having a total dissolved solids content much greater than about 10,000 ppm by weight, e.g., up to about 170,000 ppm by weight. Furthermore, of said total dissolved solids, the amount of polyvalent metal ions such as calcium, magnesium, etc. can be greater than 1,000 ppm by weight. Good results have been obtained when using brines having greater than 12,000 ppm by weight of said polyvalent metal ions.

Another advantage is using strong field produced brines in preparing aqueous gels as described herein, in addition to the economic advantage of using readily available materials, is that the problem of disposing of such brines is lessened.

Suitable reducing agents which can be used in the practice of the invention include sulfur-containing compounds, such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125°–130° F. The presently most preferred reducing agents are sodium hydrosulfite or potassium hydrosulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water or brine, exposure to air during preparation of the gels, and possible contact with other oxidizing substances such as might be encountered in field operations. As a general guide, the amount or reducing agent used will generally be within the range of from 1.0 to at least 200, preferably from 3 to about 100, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount or reducing agent to be used by simple experiments carried out in the light of this disclosure.

Various methods can be used for preparing the aqueous gels used in the practice of the invention. Either the metal-containing compound or the reducing agent can be first added to a solution or dispersion of the polymer in water or brine, or said metal-containing compound and said reducing agent can be added simultaneously to the solution or aqueous medium containing the polymer. Generally speaking, where convenient, the preferred method is to first disperse the polymer in the water or other aqueous medium, such as brine. The reducing agent is then added to the dispersion of polymer, with stirring, The metal-containing compound is then added to the solution or aqueous medium containing the polymer and the reducing agent, with stirring. Gelation starts as soon as reduction of some of the higher valence metal in the starting polyvalent metal-containing compound to a lower valence state occurs. The newly-formed lower valence metal ions, for example, +3 chromium obtained from +6 chromium, effect rapid crosslinking of the polymer and gelation of the solution or aqueous medium containing same.

In another method, the aqueous gels can be formed in situ in the formation to be treated. This method is useful when the reducing agent is a reducing gas, such as hydrogen sulfide or a hydrogen sulfide containing gas. The reducing gas can be naturally occurring in the formation or can be introduced into the formation. Thus, the polymer can be dispersed in water and the metal-containing compound adding to the resulting dispersion. Said dispersion is then pumped into contact with said formation. Upon contacting the reducing gas, either naturally occurring or injected following the injection of said dispersion, the metal in the metal-containing compound will be reduced, e.g., $Cr^{+6}$ to $Cr^{+3}$, and gelation will be effected. If desired, the gel can then be moved through said formation by the subsequent injection of a drive fluid, e.g., water.

It is also within the scope of the invention to prepare a dry mixture of the polymer, the metal-containing compound and the reducing agent, in proper proportions, and then add this dry mixture to the proper amount of water or brine.

In general, with the proper amounts of polyvalent metal and reducing agent, the amount of polymer used will determine the consistency of the gel obtained. Small amounts of polymer will usually produce liquid mobile gels which can be readily pumped whereas large amounts of polymer will usually produce thick, viscous, somewhat elastic gels. If desired, said thick gels can be "thinned" by dilution with water or brine to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

However, we have discovered that when a liquid mobile gel is desired, it is definitely preferred to first prepare a concentrated gel and dilute the more concentrated gels before they become too viscous. In general, dilute gels are more difficult to prepare in that, for one thing, gelling times are longer. More importantly, for some reason not yet completely understood, the gels are usually more effective in their intended uses when a concentrated gel is first prepared and then diluted to the desired concentration. Another advantage is that, in general, less gelling agents are required for a given viscosity.

An advantage of the invention is that ordinary ambient temperatures and other conditions can be used in practically all instances in preparing the aqueous gels used in the practice of the invention or aqueous mediums containing same. However, in some instances, a small amount of heat may be desirable to aid in the formation of the gel, e.g., heating to a temperature of about 125°–130° F.

Aqueous gels used in the practice of the invention can be prepared having a wide range of viscosities or firmness ranging from low viscosity or highly mobile gels having a relatively low viscosity up to thick, viscous, somewhat elastic gels which are relatively nonmobile. The choice of gel viscosity or concentration will depend upon the use to be made of the gel. For example, when the gel is to be used in a fluid drive operation for the secondary recovery of oil, or otherwise injected into the pores of a nonfractured porous media, the gel viscosity or concentration can have any value which will permit the gel to be injected into said pores for the intended purpose. The actual viscosity and/or gel strength of the gel will depend upon the type and concentration of the polymer, the type and amount of starting polyvalent metal compound used, and the type and amount of reducing agent used.

One presently preferred procedure is to prepare a relatively concentrated or high viscosity gel and dilute same to a viscosity or concentration suited for the actual use of the gel. In many instances, this procedure results in a more stable gel, in addition to the advantages mentioned above.

When employing said dilution technique, a starting solution or dispersion of polymer containing, for example, 1,000 to 10,000 ppm (0.1 to 1 wt. %) or more of polymer can be used. This solution or dispersion is then gelled by the addition of suitable amounts of polyvalent metal compound and reducing agent. After gelation has proceeded to the desired extent, the resulting gel can be diluted with water to the concentration or viscosity most suited for its intended use. For example, if the gel is to be used in a waterflood operation, it could be diluted to a nominal 4,000, 2,500, 1,000, 500, 250, or less, ppm gel by the addition of a suitable amount of water. The more concentrated polymer solutions or dispersions usually have a faster rate of gelation. Thus, in most instances, it will be preferred to carry out the dilution soon after the components of the gel have been added to the water or brine, e.g., within about 5 to 30 minutes. Preferably, the concentration of the polymer in the "concentrated gel" will be at least twice that in the final gel. Dilution of the gel retards the rate of gelation. Thus, this dilution technique can be employed to control the gelation rate, if desired. In many instances, gels prepared by employing said dilution technique are more stable. Another advantage of said dilution technique is that it is usually more convenient to weigh out and handle the larger quantities of reagents.

We are aware that chromium ions having a valence of $+3$ have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of $+3$, e.g., $CrCl_3$, $Cr(NO_3)_3$, etc. In the practice of the present invention, the $Cr^{+3}$ ions must be newly formed, e.g., nascent ions formed in situ in the solution to be gelled by the reduction of $Cr^{+6}$ ions to $Cr^{+3}$ ions. We have found that aqueous gels of polymer solutions prepared using such newly formed $Cr^{+3}$ ions have much better long term stability than do gels prepared by the direct addition of $Cr^{+3}$ ions.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer. We have also found that formation solids such as sandstone and limestone improve gel stability.

Generally speaking, the pH of the final solution of the gelling reagents is preferably less than 7, more preferably in the order of 6. In general, pH is not controlling, but higher pH values retard gelation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of polymer contained therein, irrespective of whether or not all the polymer has entered into the gel-forming reaction. For example, a 1 weight percent or 10,000 ppm gel is a gel which was prepared from a starting polymer solution or dispersion which contained 1 weight percent or 10,000 ppm by weight of polymer. The same system is employed for the gels prepared by the above-described dilution technique.

As indicated above, the above-described aqueous gels are particularly useful in fluid drive operations for the enhanced recovery of oil. Said gels are applicable for decreasing the mobility of a drive fluid, such as water or other fluids, or decreasing the permeability of nonfractured porous formations prior to or during enhanced recovery operations, such as fluid drive processes, and also for water shutoff treatments in producing wells. In such processes the aqueous gels can be injected into the formation prior to or subsequent to another injected fluid. For example, in one particular useful application, a slug of aqueous gel can be injected after a previously injected slug of a fluid such as a detergent and/or oil-containing fluid which serves to loosen the oil from the formation. Said slug of gel can then be followed by water to push both of said slugs toward the production well. In one embodiment of the invention, a conventional waterflood or gas drive is carried out in conventional manner until the drive fluid breaks through into the production well in excessive amounts. An above-described gel is then pumped down the well and into the nonfractured porous formation in any suitable manner, any suitable amount, and for any desired period of time sufficient to obtain the desired in-depth penetration and decrease in mobility of the drive fluid or decrease in permeability of the high permeability zones of said formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from one day to six months. Or, the injection of the gel can be carried out by injecting a slug of about 200 to 5,000 barrels of gel into the well and then into the formation. Injection in one of the above manners will provide a flood front adjacent to the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity of concentration of the gel can gradually be lessened through a series of incremental decreases rather than discontinuing the injection thereof abruptly. Also if desired, said slug of brine or water can be followed with another slug of gel.

In another embodiment of the invention, the nonfractured porous formation can be treated prior to carrying out the fluid drive secondary recovery operations. This embodiment is particularly applicable where there is a good knowledge of the nature of the formation. Thus, in such a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, either oil wells or gas wells, where there is a more porous nohydrocarbon-bearing strata adjacent the hydrocarbon-bearing strata. For example, such a condition can exist where there is a water sand adjacent to the hydrocarbon-bearing sand and the water intrudes into the borehole and interferes with the production of hydrocarbon. In such instances, the formation can be treated in accordance with the invention to prevent the flow of water.

The practice of this invention is further illustrated by reference to the following examples which are intended to be representative rather than restrictive of the scope of the invention. Unless otherwise indicated, all parts and percentages are by weight.

EXAMPLE 1

In a three-liter stirred flask, blanketed with nitrogen, there was prepared an ethyl acrylate/methacrylic acid copolymer latex employing the following formula, all parts being by weight:

| | |
|---|---|
| Water | 364 |
| Ammonium lauryl polyethyleneoxy sulfate (12 moles ethylene oxide) (26.5% by weight active) | 18.85 |
| Ethyl acrylate | 35 |
| Methacrylic acid | 65 |
| t-butyl hydroperoxide | 0.05 |
| Sodium formaldehyde sulfoxylate | 0.13 |
| Water | 6.48 |

The polymerization was started at 22° C. and the exotherm increased the temperature to approximately 55° C. at the end of 1¾ hours. There was obtained a stable latex with a total solids content of 20.3%.

A portion of this latex was diluted to 2% polymer solids with water; sufficient sodium hydroxide at 5% solution was added to neutralize the latex to a pH of approximately 8.25.

100 grams of the 2% polymer solution was neutralized to about a pH of 8.0 with NaOH and was further diluted with water to give a solution of 1% by weight of polymer. Aliquot portions were then crosslinked with the $Cr^{3+}$ system by adding sodium dithionite ($Na_2S_2O_4$) and sodium dichromate ($Na_2Cr_2O_7$). In Runs 1 and 3, salt was added prior to the addition of the Redox system, and prior to the dilution of the 2% solution to a 1% by weight polymer solution. In the case of Runs 2 and 4, the salt was added after the dilution to 1%.

Two controls, Runs 5 and 6, which contain no crosslinking agents, were also prepared. The results are given in the table below in which column 1 is the run number, column 2 is the percent of polymer in the gel; column 3 is the percent salt employed; column 4 is the percent $Na_2S_2O_4$; column 5 is the percent $Na_2Cr_2O_7$; and column 6 is the Brookfield viscosity obtained on the gel.

| Run No. | % Polymer | % Salt | % $Na_2S_2O_4$ | % $Na_2Cr_2O_7$ | Brookfield Viscosity (cps) |
|---|---|---|---|---|---|
| 1 | 0.25 | 3.0 NaCl | 0.0375 | 0.0063 | 38.3 |
| 2 | 0.125 | 3.0 NaCl | 0.0188 | 0.0031 | 7.7 |
| 3 | 0.25 | 0.75 NaCl | 0.0375 | 0.0063 | 47.5 |
| 4 | 0.125 | 0.75 NaCl | 0.0188 | 0.0031 | 14.5 |
| 5 | 0.25 | 3.0 NaCl | — | — | 11.0 |
| 6 | 0.25 | No salt | — | — | 260 |

In another experiment utilizing a polymer of the same composition prepared with slightly less t-butyl hydroperoxide and sodium formaldehyde sulfoxylate, when employed with water, at a concentration of 0.10 percent polymer and water containing no salt, no water soluble compound of a polyvalent metal and no water soluble reducing agent, thus the polymer has not been crosslinked, gave a viscosity of 32.5 cps.

EXAMPLE 2

A latex was prepared in a manner similar to that of Example 1 except that 40 parts of ethylacrylate and 60 parts of methacrylic acid was employed as the monomer and the catalyst system was 0.1 part of potassium persulfate was employed instead of t-butyl peroxide, sodium formaldehyde sulfoxylate and the 6.4 parts of water. The polymerization was conducted at 50° C. for a period of 8 hours. A similar solids latex content was obtained. Portions of this latex were diluted with water to form a 2% by weight polymer solution and neutralized with NaOH to a pH of approximately 8 to 8.5.

100 grams of the 2% neutralized latex solution was diluted to give a 1% polymer solution. The salt was added to the latex solution at this point. The $Na_2S_2O_4$ and $Na_2Cr_2O_7$ was added and the gels tested for viscosity. The results are given in the table below:

| Run No. | % Polymer | % Salt | % $Na_2S_2O_4$ | % $Na_2Cr_2O_7$ | Brookfield Viscosity (cps) |
|---|---|---|---|---|---|
| 1 | 0.25 | 3.0 NaCl | 0.0375 | 0.0125 | 14.0 |
| 2 | 0.25 | 6.0 NaCl | 0.375 | 0.0375 | 15.0 |
| 3 | 0.25 | 2.2 NaCl 0.6 $CaCl_2$ 0.3 $MgCl_2$ | 0.0750 | 0.075 | 12.5 |

While certain representative embodiments and details have been shown for the purpose of illustrating the invention, it will be apparent to those skilled in this art that various changes and modifications may be made therein without departing from the spirit or scope of the invention.

What is claimed is:

1. An aqueous medium comprising water to which has been added a water thickening amount of a water thickening polymer which is prepared by polymerizing at least one alkyl acrylate monomer and at least one carboxylic polymerizable monomer selected from the group consisting of acrylic acid and methacrylic acid which are present from 20 to 95 parts by weight per hundred parts of total monomer being polymerized and utilizing, as an ionic emulsifier, an emulsifier selected from the group consisting of disodium or diammonium nonylphenoxy polyethoxy sulfosuccinate having the general formula:

$$CH_3(CH_2)_8C_6H_4O(CH_2CH_2O)_{8-16}COCH_2CH(COOM)SO_3Q$$

wherein Q is sodium or ammonium and a sodium or ammonium lauryl polyethoxysulfate having the general formula:

$$CH_2(CH_2)_{11}O(CH_2CH_2O)_{8-16}SO_3Q$$

wherein Q is sodium or ammonium, said polymer in latex form being neutralized to a pH ranging between a pH of 5.5 to 11.5.

2. An aqueous medium according to claim 1 in which the water thickening polymer is employed in amounts ranging from 0.05 to about 2% by weight based on the weight of the water.

3. An aqueous medium according to claim 1 in which the acrylic acid or methacrylic acid are present in the water thickening polymer in an amount varying from about 55 to about 75 parts per hundred parts of total monomer being polymerized.

4. An aqueous medium according to claim 1 in which said polymer has been neutralized to a pH ranging between a pH of 6.5 to 8.5.

5. An aqueous medium according to claim 2 in which the amount of water thickening polymer ranges from about 0.1 to about 0.5 percent by weight based on the weight of the water.

6. An aqueous medium comprising water to which has been added a water thickening amount of a water thickening polymer which is prepared by polymerizing at least one alkyl acrylate monomer and at least one carboxylic polymerizable monomer selected from the group consisting of acrylic acid and methacrylic acid which are present from 20 to 95 parts by weight per hundred parts of total monomer being polymerized and utilizing, as an ionic emulsifier, an emulsifier selected from the group consisting of disodium or diammonium nonylphenoxy polyethoxy sulfosuccinate having the general formula:

$$CH_3(CH_2)_8C_6H_4O(CH_2CH_2O)_{8-16}COCH_2CH(COOM)SO_3Q$$

wherein Q is sodium or ammonium and a sodium or ammonium lauryl polyethoxysulfate having the general formula:

$$CH_2(CH_2)_{11}O(CH_2CH_2O)_{8-16}SO_3Q$$

wherein Q is sodium or ammonium, said polymer in latex form being neutralized to a pH ranging between a pH of 5.5 to 11.5 and containing from about 1 to about 200 weight percent of a water soluble compound of a polyvalent metal selected from the group consisting of chromium compounds in which the chromium has a valence of +6 which is capable of being reduced to a lower valent state of +3 and manganese compounds in which the manganese has a valence of +7 and which is capable of being reduced to a lower valent state of +4 and from about 1 to about 200 weight percent of a water soluble reducing agent, based on the weight of said polymer, which is effective to reduce at least a portion of said metal to said lower valent state.

7. An aqueous medium according to claim 6 in which the water thickening polymer is employed in amounts ranging from 0.05 to about 2% by weight based on the weight of the water.

8. An aqueous medium according to claim 6 in which the acrylic acid or methacrylic acid are present in the water thickening polymer in an amount varying from about 55 to about 75 parts per hundred parts of total monomer being polymerized.

9. An aqueous medium according to claim 6 in which said polymer has been neutralized to a pH ranging between a pH of 6.5 to 8.5.

10. An aqueous medium according to claim 7 in which the amount of water thickening polymer ranges from about 0.1 to about 0.5 percent by weight based on the weight of the water.

11. An aqueous medium according to claim 6 in which the water soluble compound of a polyvalent metal ranges from 3 to 100% by weight and the water soluble reducing agent ranges from 3 to 100% by weight, both being based on the weight of said polymer.

12. The aqueous medium according to claim 6 in which the water soluble compound of a polyvalent metal is sodium dichromate or potassium dichromate and in which the water soluble reducing agent is sodium hydrosulphite or potassium hydrosulphite.

* * * * *